United States Patent
Seigel et al.

(10) Patent No.: US 9,881,172 B1
(45) Date of Patent: Jan. 30, 2018

(54) SYSTEMS AND METHODS OF FILE TRACKING AND NOTIFICATION

(71) Applicant: Dell Software Inc., Aliso Viejo, CA (US)

(72) Inventors: Jake Seigel, Halifax (CA); Sohail Ali, Halifax (CA); Bashar Alhassani, Halifax (CA)

(73) Assignee: Quest Software Inc., Aliso Viejo, CA (US)

( * ) Notice: Subject to any disclaimer, the term of this patent is extended or adjusted under 35 U.S.C. 154(b) by 149 days.

(21) Appl. No.: 15/055,210

(22) Filed: Feb. 26, 2016

(51) Int. Cl.
   *G06F 21/62* (2013.01)

(52) U.S. Cl.
   CPC ............................... *G06F 21/6218* (2013.01)

(58) Field of Classification Search
   CPC .................................................. G06F 21/6218
   See application file for complete search history.

(56) References Cited

U.S. PATENT DOCUMENTS

| | | | |
|---|---|---|---|
| 7,603,397 B1* | 10/2009 | Hagerstrom | ........ G06F 11/1435 |
| 7,818,801 B2 | 10/2010 | Small | |
| 8,266,231 B1 | 9/2012 | Golovin et al. | |
| 8,650,578 B1 | 2/2014 | Binotto et al. | |
| 8,655,844 B1 | 2/2014 | Wong | |
| 9,632,949 B2* | 4/2017 | Hasegawa | ............. G06F 12/121 |
| 9,658,781 B2* | 5/2017 | Dolph | ................... G06F 3/0611 |
| 2008/0086718 A1 | 4/2008 | Bostick et al. | |
| 2008/0195826 A1* | 8/2008 | Yamazaki | ............. G06F 3/0608 711/161 |
| 2012/0179708 A1 | 7/2012 | McMahon et al. | |

* cited by examiner

*Primary Examiner* — Beemnet Dada
(74) *Attorney, Agent, or Firm* — Winstead PC (57) ABSTRACT

In one embodiment, a method is performed by a computer system. The method includes monitoring events in relation to files stored at multiple network nodes and, responsive to the monitoring, detecting that a new file has been created from an existing file. The method further includes accessing a stored file-family model of the existing file, the stored file-family model comprising interconnected nodes, wherein the interconnected nodes represent a plurality of overlapping file variants such that one of the interconnected nodes represents the existing file. In addition, the method includes logically connecting the existing file and the new file in the stored file-family model. The method also includes determining a primary file variant in the stored file-family model and, responsive to a determination that the existing file is not the primary file variant, notifying one or more users.

20 Claims, 3 Drawing Sheets

SYSTEMS AND METHODS OF FILE TRACKING AND NOTIFICATION

BACKGROUND

Technical Field

The present disclosure relates generally to event monitoring and more particularly, but not by way of limitation, to systems and methods of file tracking and notification

History Of Related Art

In an enterprise environment, files are constantly copied from location to location. Users frequently access and edit these files without realizing that they may have been derived from other files.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes monitoring events in relation to files stored at multiple network nodes and, responsive to the monitoring, detecting that a new file has been created from an existing file. The method further includes accessing a stored file-family model of the existing file, the stored file-family model comprising interconnected nodes, wherein the interconnected nodes represent a plurality of overlapping file variants such that one of the interconnected nodes represents the existing file, wherein interconnections between the interconnected nodes reflect parent-child relationships between the plurality of overlapping file variants. In addition, the method includes logically connecting the existing file and the new file in the stored file-family model. The method also includes determining a primary file variant in the stored file-family model. Further, the method includes, responsive to a determination that the existing file is not the primary file variant in the stored file-family model, notifying one or more users that the new file was not created from the primary file variant.

In one embodiment, an information handling system includes a processor. The processor is operable to implement a method. The method includes monitoring events in relation to files stored at multiple network nodes and, responsive to the monitoring, detecting that a new file has been created from an existing file. The method further includes accessing a stored file-family model of the existing file, the stored file-family model comprising interconnected nodes, wherein the interconnected nodes represent a plurality of overlapping file variants such that one of the interconnected nodes represents the existing file, wherein interconnections between the interconnected nodes reflect parent-child relationships between the plurality of overlapping file variants. In addition, the method includes logically connecting the existing file and the new file in the stored file-family model. The method also includes determining a primary file variant in the stored file-family model. Further, the method includes, responsive to a determination that the existing file is not the primary file variant in the stored file-family model, notifying one or more users that the new file was not created from the primary file variant.

In one embodiment, a computer-program product includes a non-transitory computer-usable medium having computer-readable program code embodied therein. The computer-readable program code is adapted to be executed to implement a method. The method includes monitoring events in relation to files stored at multiple network nodes and, responsive to the monitoring, detecting that a new file has been created from an existing file. The method further includes accessing a stored file-family model of the existing file, the stored file-family model comprising interconnected nodes, wherein the interconnected nodes represent a plurality of overlapping file variants such that one of the interconnected nodes represents the existing file, wherein interconnections between the interconnected nodes reflect parent-child relationships between the plurality of overlapping file variants. In addition, the method includes logically connecting the existing file and the new file in the stored file-family model. The method also includes determining a primary file variant in the stored file-family model. Further, the method includes, responsive to a determination that the existing file is not the primary file variant in the stored file-family model, notifying one or more users that the new file was not created from the primary file variant.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

In the context of computer operating systems, a file may be defined as a named collection of data. Files are normally retained in storage devices. A file system is that portion of an operating system whose primary task is to manage the files retained on one or more storage devices. In general, the file system is the means through which all files are manipulated (e.g., created, destroyed and modified). To aid in this task, file systems retain and/or obtain information about each file, so called "metadata." Illustrative file metadata include the file's user-specified name, a file identifier (for uniquely identifying the file to the file system), a pointer or reference to the file in non-volatile storage (or main memory), the user ID associated with the file's creation, the time at which the file was created, the user ID associated with the last modification to the file, the time the last modification to the file was made and security information. Illustrative security information includes which specified users or user groups (e.g., administrator, employees and executives) are permitted to read or modify the file. It will be recognized that some, or all, of this metadata may be retained within the file itself. For purposes of this patent application, a file-system object can encompass a file, group of files, a directory, a folder, and/or the like.

In an enterprise, there are often many file systems. A technical problem associated with file systems is managing and controlling changes to files. For example, a file may originate on one file system and then be copied any number of times to another file system or within the same file system. This can result in numerous overlapping file variants, across multiple storage locations, being viewed and modified by various distinct users. As a general matter, users may not be aware of the existence of the numerous overlapping file variants. As a result, users may continue to view or edit files without knowledge of the fact that they are not working with a primary or current version.

One way to address the above problem might be to use a versioning tool to track new versions of files. However, this methodology generally requires users to initiate the versioning process and keep files in the ecosystem controlled by the versioning tool. If, for example, files are copied elsewhere, multiple file variants can co-exist and be independently modified without users being aware of a potential problem.

The present disclosure describes examples of tracking changes to files stored at multiple network nodes in multiple file systems. In certain embodiments, file-family models can be developed, stored and dynamically updated to trace logical relationships between files. The file-family model can include, for example, interconnected nodes that represent overlapping file variants. In general, one of the interconnected nodes of a given file-family model can represent a primary file variant. The primary file variant of a given file family can represent the authorized or controlling file variant in the file family. In the other words, it can often be presumed that, as a general matter, users should view or edit the primary file variant. Viewing or editing any other file variant can, in many cases, be considered a potential error.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
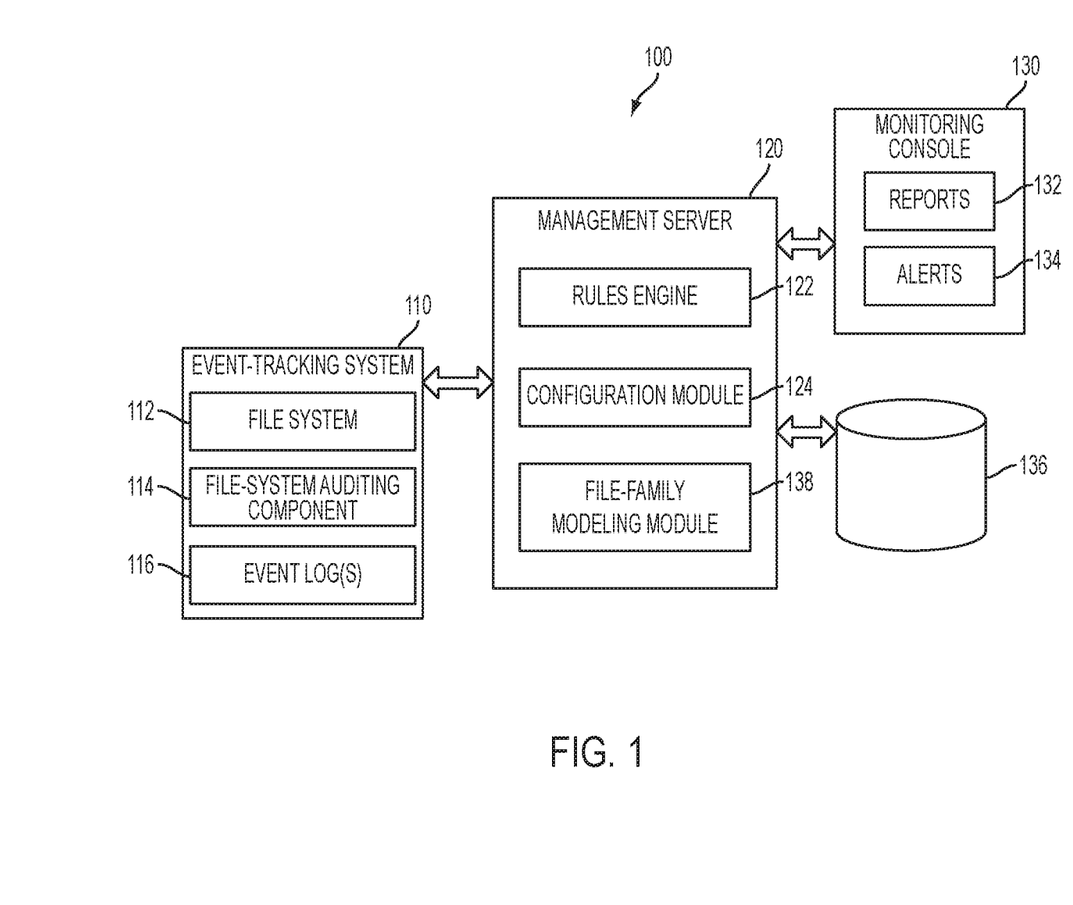
FIG. 1 illustrates an example of a system for monitoring a file-system environment.

FIG. 1 illustrates an example of a system 100 for monitoring a file-system environment. In general, the system 100 is configured to provide for real-time security auditing and/or reporting on activity in the file-system environment. For example, the file-system environment can comprise a Microsoft Windows® environment, a Linux environment, a UNIX environment, combinations of same, and/or the like.

As shown in FIG. 1, the system 100 can include a file-event tracking system 110 that is in communication with a management server 120. The management server 120 is further in communication with a monitoring console 130. In general, the management server 120 coordinates real-time monitoring and/or reporting of activity on the file-event tracking system 110. As discussed in more detail below, the monitoring console 130 provides for user interaction with the management server 120. In certain embodiments, the file-event tracking system 110 can include a single information handling system (e.g., a single computer or server) or can be distributed among multiple information handling systems (e.g., multiple servers coupled through a network).

The file-event tracking system 110 can further include file systems 112 and a file-system auditing component 114. For illustrative purposes, the file systems 112 are shown on the file-event tracking system 110. However, it should be appreciated that the file systems 112 can be distributed across multiple nodes of a network. In similar fashion, for illustrative purposes, the file-system auditing component 114 is shown to reside on the file-event tracking system 110. In certain embodiments, the file-system auditing component 114 can include hardware/software modules and/or subcomponents for real-time monitoring or auditing of the file systems 112. For example, the file-system auditing component 114 can be configured to monitor user file-system activity. Types of file-system activity that may be specified by a user include directory and file operations such as create, delete, move, rename, security change (e.g., a change to permissions), access denied while creating, access denied while opening actions, etc.

In certain embodiments, an administrator or other user may specify that one or more of these file-system actions be tracked on a per-file, per-directory, per-user group, per-process, and/or per-user basis. In addition, all of one or more specified file-system activities may also be tracked (regardless of file, directory, group, process or user identification). File-system activities that are tracked may be considered file-system events. In various embodiments, file-system-event specification can be obtained from a user (e.g., a system administrator) though a graphical user interface (GUI). In certain embodiments, the data obtained by the file-system auditing component 114 can be used as audit data and/or to identify potential security breaches or threats in the file-event tracking system 110.

It will be appreciated that, in other embodiments, the file-system auditing component 114 can at least partially reside on a remote system such as the management server 120. For instance, the file-system auditing component 114 can be in the form of various modules. As can be appreciated by one of ordinary skill in the art, each of the modules can comprise various sub-routines, procedures, definitional statements, and/or macros. Moreover, individual modules can be compiled and linked into an executable program, installed in a dynamic link library, or may be written in an interpretive language. It will be appreciated that software modules can be callable from other modules or from themselves, and/or may be invoked in response to detected events or interrupts.

In certain embodiments, the file-system auditing component 114 is further configured to generate one or more event logs 116 that include information captured, detected or otherwise generated in real-time by the file-event tracking system 110. For instance, the event log(s) 116 can include information on file-system events as described above. Although the event log(s) 116 are shown as being stored on the file-event tracking system 110, it will also be understood that the event log(s) 116 can be stored with the file-system auditing component 114 or remote to the file-event tracking system 110. In certain embodiments, the event log(s) are encrypted, write-protected or otherwise maintained to prevent modification of information therein by users, administrators or other personnel with privileged or super access rights.

The file-system auditing component 114, in certain implementations, outputs data obtained from or concerning the file systems 112 to the management server 120 for storage and/or analysis. For instance, data from the event log(s) 116 may be evaluated and/or sent to the management server 120. In certain embodiments, the file-system auditing component 114 encrypts this data prior to transmission to the management server 120. The data can be stored, for instance, in a data store 136, such as a SQL server.

The management server 120 is shown to include a rules engine 122, a configuration module 124, and a file-family modeling module 138. In certain embodiments, the file-family modeling module 138 monitors file-system events detected by the file-system auditing component 114 for file-family events. A file-family event can, in some cases, correspond to file-system events. In other cases, a file-family event can be a configurable subset of file-system events (e.g., only write events). In still other cases, a file-family event can be a configurable composite of file-system events. For example, a read event at a source node in combination with a write event at a destination node, where both events relate to the same file at the source node, can indicate that a new file has been created from an existing file (i.e., a new file variant that has been directly derived from the existing file), sometimes referred to herein as a new-file-variant event. The fact that a new file has been created from an existing file can be considered an example of a file-family event. The file-family modeling module 138 can be initiated or triggered with respect to certain users or groups of users, certain files or groups files, and/or the like.

The file-family modeling module 138 can develop file-family models and store file-family models in the data store 136. The file-family models can each be represented as files, data in a relational database, and/or in other suitable ways. In some embodiments, the file-family modeling module 138 can represent each known file of the file systems 112 (or a configurable subset thereof) in a file-family model. In other embodiments, the creation of a file-family model can be triggered upon new-file-variant events as described above, such that there are only file-family models when at least two file variants are known to be part of the same file family.

For illustrative purposes, the file-family modeling module 138 is shown to be resident on the management server 120. However, it should be appreciated that, in various other embodiments, the file-family modeling module 138 can reside on the file-event tracking system 110 or on another network node in communication with the system 100. In addition, in some embodiments, the file-family modeling module 138 can be a sub-module of the file-system auditing component 114.

In certain embodiments, the rules engine 122 is configured to analyze the data either as it is received (e.g., streamed) directly from the file-system auditing component 114 and/or the file-family modeling module or after retrieving the data from the data store 136. In certain embodiments, the rules engine 122 includes user-defined business rules, policies, metrics, sites, data sources, configuration objects, real-time monitoring rules, combinations of the same, and/or the like. In an example, the rules engine 122 can be used to determine when to initiate the file-family modeling module 138. For instance, the rules engine 122 can determine whether the file-family modeling module 138 should be triggered upon certain file-system events, at certain time intervals (e.g., daily, weekly, etc.), at a scheduled point in time, etc.

In another example, the rules engine 122 can be used to determine, for a given file family, which file variant should be considered the primary file variant. In some cases, the primary file variant can be considered a most-recently edited version represented in a stored file-family model. In other cases, the primary file variant can be considered a deepest node in the stored file-family model, which node will generally correspond to a most-recently created file variant in the file family. In still other cases, the primary file variant can be considered a root node in the stored file-family model, which node will generally correspond to a first or original file variant in the file family. In certain embodiments, the primary file variant can be specified, or overridden by, user specification of which node corresponds to the primary file variant. The primary file variant can also be determined in other suitable ways that will be apparent to one skilled in the art after reviewing the present disclosure.

In yet another example, the rules engine 122 can be used to determine when a report and/or alert needs to be sent to the monitoring console 130 based on information gathered by the file-system auditing component 114 and/or the file-family modeling module 138. For example, the rules engine 122 can determine whether, given a result reached by the file-family modeling module 138, one or more alerts should be sent. The rules engine 122 can further specify to whom the one or more alerts should be sent and how the one or more alerts should be delivered.

In certain embodiments, the configuration module 124 receives user input regarding settings for the monitoring and/or auditing of the file systems 112. In certain embodiments, the configuration module 124 communicates with a computer operated by information technology (IT) personnel, an administrator, a security officer, a compliance officer or auditor, or the like. In an example, a user can use the configuration module 124 to specify rules for initiating the file-family modeling module 138. Such rules can be maintained by the rules engine 122 as described above. In another example, a user can use the configuration module 124 to specify rules for determining primary file variants and/or select a primary file variant for particular file families.

In yet another example, the configuration module 124 can interact with a user interface to manage reporting tasks and/or real-time alerting by the management server 120. In certain embodiments, reporting tasks can include storing audit data in repositories, importing necessary data to audit databases and/or building reports based on the data. Real-time alerting can include, for instance, creating alerts when particular events are detected or identified by the file-family modeling module 138. For instance, in various embodiments, the configuration module 124 can allow a user or administrator to configure for which file-family events alerts should be generated and who should receive those alerts. Real-time alerting can also include, for example, storing the alerts in a database and/or immediately issuing notifications. In certain embodiments, the configuration module 124 can be further adapted for obtaining and/or analyzing data stored in the data store 136, modifying or adding to the rules in the rules engine 122 in other ways than described above, combinations of the same, and/or the like.

In certain embodiments, the configuration module 124 can be configured to communicate with the monitoring console 130 to obtain user input regarding the auditing of file system data. In certain embodiments, a user may use the configuration module 124 to specify that one or more file system events be tracked on a per-file, per-directory, per-user group, per-process, and/or per-user identification basis. In addition, all of one or more specified event types may also be tracked (regardless of file, directory, group, process or user identification).

The monitoring console 130 advantageously provides an interface for communicating to a user one or more results of the monitoring process. In certain embodiments, the monitoring console 130 comprises a web-based application for working with real-time monitoring alerts. For instance, the application may track the progress of alert resolution and/or include tools for customizing the user interface display.

As illustrated in FIG. 1, the monitoring console 130 further comprises reports 132 and alerts 134. In certain embodiments, the alerts 134 comprise real-time notification of events of interest, such as for example, via email, a text message, a pop-up window, instant message, combinations of the same or the like. The reports 132, in certain embodiments, comprise an analysis tool, such as a log or list of the events of interest, that may be later accessed and evaluated. Moreover, in certain embodiments, the monitoring console 130 can be configured to maintain user profiles such that users can view only the alerts and/or reports they need and/or have permission to access.

Figure 2:
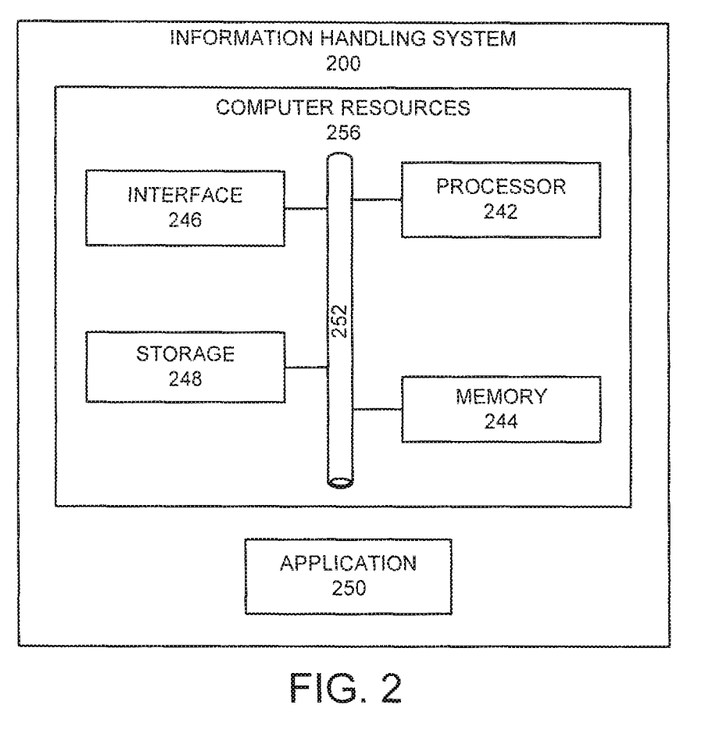
FIG. 2 illustrates an example of an information handling system.

FIG. 2 illustrates an example of an information handling system 200 that, in some cases, can be representative, for example, of the file-event tracking system 110, the management server 120 and/or the monitoring console 130. The information handling system 200 includes an application 250 operable to execute on computer resources 256. The application 250 can be similar, for example, to the file-system auditing component 114, the rules engine 122, the configuration module 124 and/or the file-family modeling module 138. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular information handling system is depicted having a particular number of particular components in a particular arrangement, this disclosure contemplates any suitable information handling system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
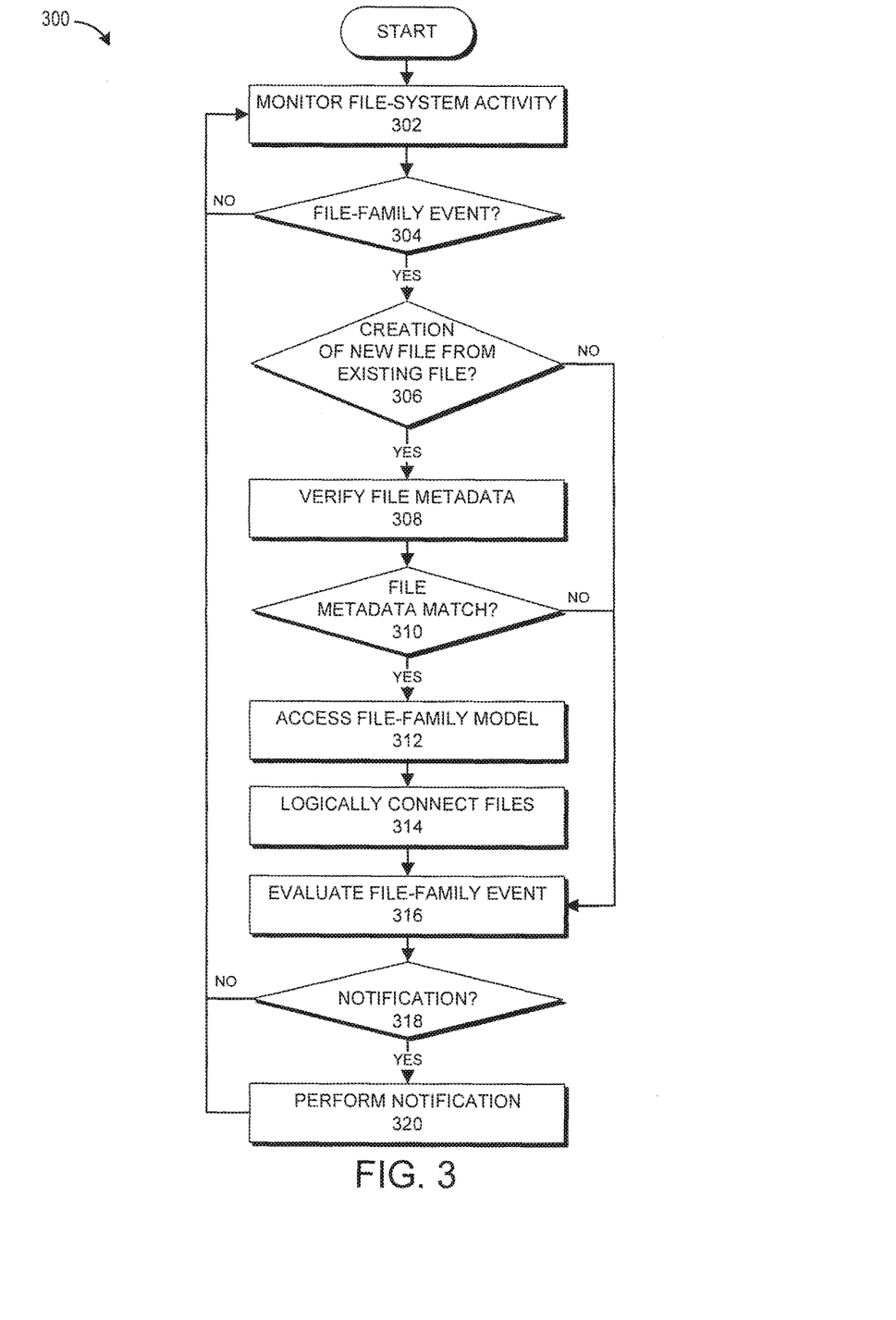
FIG. 3 illustrates an example of a process for performing file tracking and notification.

FIG. 3 illustrates an example of a process 300 for performing file tracking and notification. For example, the process 300, in whole or in part, can be implemented by one or more of the file systems 112, the file-system auditing component 114, the file-family modeling module 138, the rules engine 122, the configuration module 124, and/or the monitoring console 130. The process 300 can also be performed generally by the file-event tracking system 110, the management server 120, and/or the system 100. Although any number of systems, in whole or in part, can implement the process 300, to simplify discussion, the process 300 will be described in relation to specific systems or subsystems of the system 100.

At block 302, the file-system auditing component 114 monitors file-system activity for file-system events as described with respect to FIG. 1. At decision block 304, it is determined whether a file-family event has occurred. If it is determined at the decision block 304 that a file-family event has occurred, the process 300 proceeds to block 306. In some embodiments, the decision block 304 can be performed by the rules engine 122 such that an affirmative determination results in the file-family modeling module 138 being triggered. Otherwise, if the decision block 304 results in a negative determination, the process 300 returns to block 302 and proceeds as described above.

At decision block 306, the file-family modeling module 138 determines whether the file-family event relates to the creation of a new file from an existing file. In certain embodiments, the file-family event can be determined to be the creation of a new file from an existing file if the file-system auditing component 114 has detected a read event at a source node in combination with a write event at a destination node in relation to a given file. If it is determined at decision block 306 that the file-family event relates to the creation of a new file from an existing file, the process 300 proceeds to block 308. Otherwise, the process 300 proceeds directly to block 316.

At block 308, the file-family modeling module 138 verifies that file metadata of the new file sufficiently matches file metadata of the existing file, such that the new file and the existing file can be considered overlapping file variants. In various cases, the block 308 can include comparing a file name, file size and/or other file attributes. By way of more particular example, in an embodiment, if the file names are identical or sufficiently similar (e.g., an edit distance of less than three) and/or if the file sizes are identical or sufficiently close (e.g., within five kilobytes), the file metadata of the new file can be considered to sufficiently match the file metadata of the existing file.

At decision block 310, the file-family modeling module 138 determines whether the file metadata of the new file has been determined to sufficiently match the file metadata of the existing file. If the decision block 310 results in a negative determination, the process 300 proceeds directly to block 316. Otherwise, if the decision block 310 results in a positive determination, the process 300 proceeds to block 312. In some embodiments, blocks 308-310 can be omitted. In these embodiments, the determination made at block 306 can be deemed sufficient such that no verification of file metadata is necessary.

At block 312, the file-family modeling module 138 accesses a stored file-family model of the existing file, for example, from the data store 136. In some cases, if no file-family model exists, for example, because the existing file has not previously been determined to be part of any particular file family, the block 312 can include creating a file-family model and storing the file-file model (e.g., with a single node representing the existing file) in the data store 136. At block 314, the file-family modeling module 138 logically connects the existing file and the new file in the stored file-family model. For example, the block 314 can include adding a node that represents the new file and linking the existing file and the new file, such that it is indicated that the new file is an overlapping file variant of the existing file. This new node and corresponding link can represent a parent-child relationship between the existing file and the new file, which files may be considered overlapping file variants.

At block 316, the file-family modeling module 138 evaluates the file-family event against rules of the rules engine 122. For example, in certain embodiments, the rules engine 122 can specify that specific notifications should occur if the file-family event satisfies certain criteria. In an example, a rule of the rules engine 122 can specify that if the file-family event is an event (e.g., read event or write event) in relation to a file variant that is not the primary file variant of the file family, a user who initiated the event should be notified. In another example, a rule of the rules engine 122 can specify that, if the file-family event has been determined to relate to the creation of a new file from an existing file, and the new file was not created from the primary file variant of the existing file's file family (e.g., as indicated by the corresponding file-family model), a user who initiated the event should be notified.

In yet another example, a rule of the rules engine 122 can specify that, if the file-family event has been determined to relate to the creation of a new file from an existing file, a target set of users should be notified. For instance, according to this example, the file-family modeling module 138, or the rules engine 122, can identify users who have permission to access the new file and notify the identified users of the new file. In addition, or alternatively, according to this example, the file-family modeling module 138, or the rules engine 122, can identify users who have permission to access both the existing file and the new file and notify the identified users of the new file. Continuing this example, in some cases, a rule of the rules engine 122 can further cause the new file to be designated as the primary file variant of the file family.

At decision block 318, the management server 120 determines whether a notification is required based, at least in part, on the rules engine 122. If so, at block 320, notification is performed in accordance with the rules of the rules engine 122. For example, one or more of the alerts 134 and/or the reports 132 may be presented on the monitoring console 130. By way of further example, messages may be sent to individuals specified by the rules of the rules engine 122. The messages can be, for example, email messages, text messages, instant messages, automated voice communications, and/or the like. From block 320, the process 300 returns to block 302 and proceeds as described above. If it is determined at the decision block 318 that no notification should be performed, the process 300 returns to block 302, without any notification being performed, and proceeds as described above. In general, the process 300 can continue until terminated, for example, by an administrator, super user or other user, or when suitable stop criteria is satisfied.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
monitoring events in relation to files stored at multiple network nodes;
responsive to the monitoring, detecting that a new file has been created from an existing file;
accessing a stored file-family model of the existing file, the stored file-family model comprising interconnected nodes, wherein the interconnected nodes represent a plurality of overlapping file variants such that one of the interconnected nodes represents the existing file, wherein interconnections between the interconnected nodes reflect parent-child relationships between the plurality of overlapping file variants;
logically connecting the existing file and the new file in the stored file-family model;
determining a primary file variant in the stored file-family model; and
responsive to a determination that the existing file is not the primary file variant in the stored file-family model, notifying one or more users that the new file was not created from the primary file variant.

2. The method of claim 1, comprising:
responsive to the monitoring, detecting a file-system event in relation to a particular file;
accessing a stored file-family model of the particular file;
determining a primary file variant in the stored file-family model of the particular file; and
responsive to a determination that the particular file is not the primary file variant in the stored file-family model of the particular file, notifying at least one user.

3. The method of claim 1, comprising:
verifying that file metadata of the new file sufficiently matches file metadata of the existing file; and
wherein the logically linking is performed responsive to the verifying.

4. The method of claim 1, wherein the primary file variant corresponds to a file represented by a root of the stored file-family model.

5. The method of claim 1, wherein the primary file variant comprises a most-recently edited file variant represented in the stored file-family model.

6. The method of claim 1, wherein the primary file variant comprises a deepest node in the stored file-family model.

7. The method of claim 1, wherein the detecting comprises detecting a read event in combination with a write event.

8. The method of claim 1, comprising:
identifying users who have permission to access to the new file; and
notifying the identified users of the new file.

9. An information handling system comprising a hardware processor, wherein the hardware processor is operable to implement a method comprising:
monitoring events in relation to files stored at multiple network nodes;
responsive to the monitoring, detecting that a new file has been created from an existing file;

accessing a stored file-family model of the existing file, the stored file-family model comprising interconnected nodes, wherein the interconnected nodes represent a plurality of overlapping file variants such that one of the interconnected nodes represents the existing file, wherein interconnections between the interconnected nodes reflect parent-child relationships between the plurality of overlapping file variants;

logically connecting the existing file and the new file in the stored file-family model;

determining a primary file variant in the stored file-family model; and responsive to a determination that the existing file is not the primary file variant in the stored file-family model, notifying one or more users that the new file was not created from the primary file variant.

10. The information handling system of claim 9, the method comprising:

responsive to the monitoring, detecting a file-system event in relation to a particular file;

accessing a stored file-family model of the particular file;

determining a primary file variant in the stored file-family model of the particular file; and responsive to a determination that the particular file is not the primary file variant in the stored file-family model of the particular file, notifying at least one user.

11. The information handling system of claim 9, the method comprising:

verifying that file metadata of the new file sufficiently matches file metadata of the existing file; and wherein the logically linking is performed responsive to the verifying.

12. The information handling system of claim 9, wherein the primary file variant corresponds to a file represented by a root of the stored file-family model.

13. The information handling system of claim 9, wherein the primary file variant comprises a most-recently edited file variant represented in the stored file-family model.

14. The information handling system of claim 9, wherein the primary file variant comprises a deepest node in the stored file-family model.

15. The information handling system of claim 9, wherein the detecting comprises detecting a read event in combination with a write event.

16. The information handling system of claim 9, the method comprising:

identifying users who have permission to access to the new file; and notifying the identified users of the new file.

17. A computer-program product comprising a non-transitory computer-usable medium having computer-readable program code embodied therein, the computer-readable program code adapted to be executed to implement a method comprising:

monitoring events in relation to files stored at multiple network nodes;

responsive to the monitoring, detecting that a new file has been created from an existing file;

accessing a stored file-family model of the existing file, the stored file-family model comprising interconnected nodes, wherein the interconnected nodes represent a plurality of overlapping file variants such that one of the interconnected nodes represents the existing file, wherein interconnections between the interconnected nodes reflect parent-child relationships between the plurality of overlapping file variants;

logically connecting the existing file and the new file in the stored file-family model;

determining a primary file variant in the stored file-family model; and responsive to a determination that the existing file is not the primary file variant in the stored file-family model, notifying one or more users that the new file was not created from the primary file variant.

18. The computer-program product of claim 17, the method comprising:

responsive to the monitoring, detecting a file-system event in relation to a particular file;

accessing a stored file-family model of the particular file;

determining a primary file variant in the stored file-family model of the particular file; and responsive to a determination that the particular file is not the primary file variant in the stored file-family model of the particular file, notifying at least one user.

19. The computer-program product of claim 17, the method comprising:

verifying that file metadata of the new file sufficiently matches file metadata of the existing file; and wherein the logically linking is performed responsive to the verifying.

20. The computer-program product of claim 17, the method comprising:

identifying users who have permission to access to the new file; and notifying the identified users of the new file.

* * * * *